(12) United States Patent
Oberle et al.

(10) Patent No.: US 9,932,066 B2
(45) Date of Patent: Apr. 3, 2018

(54) PLASTIC ELEMENT FOR LASH-FREE SUPPORT

(71) Applicant: IMS Gear Gmbh, Donaueschingen (DE)

(72) Inventors: Stephan Oberle, Villingen-Schwenningen (DE); Gregor Mauerlechner, Villingen-Schwenningen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 14/990,523

(22) Filed: Jan. 7, 2016

(65) Prior Publication Data

US 2016/0236707 A1    Aug. 18, 2016

(30) Foreign Application Priority Data

Feb. 13, 2015   (EP) .................................... 15154984

(51) Int. Cl.
  *F16H 57/023*   (2012.01)
  *B62D 5/04*    (2006.01)
  (Continued)

(52) U.S. Cl.
  CPC ............. *B62D 5/0454* (2013.01); *B62D 3/04* (2013.01); *F16H 55/22* (2013.01); *F16H 57/021* (2013.01);
  (Continued)

(58) Field of Classification Search
  CPC ....... B62D 5/0454; B62D 5/04; F16H 57/039; F16H 2057/0213
  See application file for complete search history.

(56) References Cited

U.S. PATENT DOCUMENTS

| | | | |
|---|---|---|---|
| 5,483,851 A | 1/1996 | Willacy et al. | |
| 6,357,313 B1 * | 3/2002 | Appleyard | B62D 5/0409 384/255 |

(Continued)

FOREIGN PATENT DOCUMENTS

| | | |
|---|---|---|
| CN | 1607710 A | 4/2005 |
| CN | 102030032 A | 4/2011 |

(Continued)

OTHER PUBLICATIONS

European Search Report dated Jul. 10, 2015 corresponding to European application No. 15154984.7-1752.

(Continued)

*Primary Examiner* — James A English
(74) *Attorney, Agent, or Firm* — Nath, Goldberg & Meyer; Jerald L. Meyer (57) ABSTRACT

A worm gearbox having a worm wheel is arranged, in a torsionally resistant manner, on a steering shaft and rotates around a steering axis. A worm shaft is supported to rotate around a rotational axis, with the worm shaft having an end on the engine side and an end away from the engine. Worm toothing engages the teeth of the worm wheel and when the worm shaft rotates around the rotational axis, the worm wheel and the steering shaft rotate around the steering axis. A gearbox housing supports the worm wheel and the worm shaft and allows them to rotate. A compensating element has a middle section, a rear end section connected to the gearbox housing and a front end section retaining the end away from the engine of the worm shaft or a holder accommodating the end away from the engine of the worm shaft.

20 Claims, 5 Drawing Sheets

(51) Int. Cl.
*F16H 57/021* (2012.01)
*F16H 57/022* (2012.01)
*B62D 3/04* (2006.01)
*F16H 55/22* (2006.01)
*F16H 57/039* (2012.01)

(52) U.S. Cl.
CPC ......... *F16H 57/022* (2013.01); *F16H 57/039* (2013.01); *F16H 2057/0213* (2013.01)

(56) References Cited

U.S. PATENT DOCUMENTS

| | | | | |
|---|---|---|---|---|
| 8,727,065 | B2* | 5/2014 | Kuroumaru | B62D 5/0409 180/443 |
| 9,193,384 | B1* | 11/2015 | Murakami | B62D 5/0454 |
| 2007/0163374 | A1* | 7/2007 | Yamazaki | B62D 5/0409 74/409 |
| 2011/0067946 | A1* | 3/2011 | Kim | B62D 5/0409 180/444 |
| 2012/0217085 | A1* | 8/2012 | Sekikawa | B62D 5/0409 180/444 |
| 2012/0227526 | A1* | 9/2012 | Lescorail | F16H 57/022 74/406 |
| 2016/0121921 | A1* | 5/2016 | Schonlechner | B62D 5/0409 180/444 |

FOREIGN PATENT DOCUMENTS

| | | |
|---|---|---|
| CN | 102649445 A | 8/2012 |
| CN | 102678883 A | 9/2012 |
| DE | 102013007883 A1 | 11/2014 |
| EP | 0509263 A2 | 10/1992 |
| EP | 2492167 A1 | 8/2012 |
| EP | 2497975 A1 | 9/2012 |
| JP | 2005201381 A | 7/2005 |
| KR | 1020070018336 A | 3/2007 |
| WO | 9911502 A1 | 3/1999 |

OTHER PUBLICATIONS

Korean office action dated Feb. 1, 2017 for parallel pending Korean patent application No. 10-2016-0009951 with English translation attached.
Chinese office action dated Sep. 22, 2017 for corresponding CN application 201610077421.3.

* cited by examiner

PLASTIC ELEMENT FOR LASH-FREE SUPPORT

The present invention relates to a device, particularly a device for pressing a screw or a screw-on sprocket to a worm wheel or a helical gear according to the preamble of claim 1. Such type of device is used, for example, when producing electromechanical power steering.

Worm gearboxes, which are used, for example, with electromechanical power steering systems, for example with EPS systems (Electric Power Steering) or with EPAS systems (Electric Power Assisted Steering), must be arranged without backlash with small torques. When there are changes in temperature and humidity, the backlash changes positively or negatively, whereby noises (positive backlash) or stiffness (negative backlash) may result in the steering. The reason for this is that the different materials used for the gearbox expand differently, whereby the worm shaft engaging tightly in the worm wheel at one temperature engages only loosely in the worm wheel at another temperature or presses too tightly against the worm wheel.

With the previous gearboxes for electromechanical power steering, an aluminum housing with a steel worm is used. The wheel worm in this case comprises a metal hub and a thin plastic sprocket. The diameter of the metal hub and of the sprocket with these designs has been selected such that the thermal, radial coefficient of linear expansion of the steel hub, sprocket, and worm as a whole corresponds approximately to that of the aluminum housing. Thus, in order to satisfy this condition, often a very large metal hub and a very thin plastic sprocket must be selected, which results in an expensive and heavy component.

Other solutions stipulate that the worm also be spring-loaded against the worm wheel by means of a complex design. In this case however, the spring deflections are normally limited such that, even here, the worm wheel must not be subjected to excessively large diameter changes by means of temperature or air humidity.

In order to solve the problem, EP 2 694 355 A1 discloses an electromechanical power steering system with an electric servomotor, which drives a worm shaft, which meshes with a worm wheel arranged on a steering shaft, in which the worm wheel has an effective connection with an input shaft of a steering gearbox, and in which the worm shaft and the steering shaft are jointly and rotatably supported in a gearbox housing. The backlash between the worm shaft and the worm wheel is limited thereby in that the worm shaft has a free end away from the engine, which is mounted in a roller bearing having an inner ring, rolling elements, and an intermediate ring, in which the intermediate ring has an inner running surface for the rolling elements and an outer running surface for outer rolling elements, and in which the inner running surface and the outer running surface of the intermediate ring are arranged eccentrically with respect to one another. In order to ensure a somewhat uniform level of pressure and engagement of the worm shaft into the teeth of the worm wheel, the eccentric pivot bearing is attached to the gearbox housing pretensioned with springs in one embodiment of this solution. If the worm wheel then expands due to thermal fluctuations or due to fluctuations in humidity, the eccentric outer roller bearing follows this expansion, so that the worm shaft rotating in the inner central bearing follows this expansion movement of the gearwheel and further meshes onto the gearwheel with essentially the same amount of pressure. Such type of solution is not only very complex but also very cost-intensive.

The object of the present invention is thus to provide a simpler, more economical solution that ensures sufficient diverting or yielding of the worm shaft when the worm wheel changes its outer diameter due to temperature changes or changes in the humidity.

This object is achieved with a device according to claim 1. Advantageous embodiments are disclosed in the dependent claims.

The inventive device has a worm wheel, which has teeth pointing outward and is arranged so as to rotate around a steering axis, in which it can be arranged and/or fastened on a steering shaft that can rotate around the steering axis in a torsionally resistant manner and/or can be connected to the steering shaft in a torsionally resistant manner. The device further has a worm shaft rotatably supported around a rotational axis with the worm shaft having an end on the engine side and an end away from the engine, as well as worm toothing, which engages between the teeth of the worm wheel such that, when the worm shaft rotates around the rotational axis, the worm wheel rotates around the steering axis. Furthermore, the device has a gearbox housing, in which the worm wheel is rotatably supported around the worm shaft, as well as a compensating element.

The worm wheel may be made of one material or of a mixture of materials. It has, for example, a metal hub comprising, steel and a plastic ring, which is also designated as a sprocket. It may also additionally have a wheel carrier material, which is also designated in this case as the wheel body or as the wheel element. The wheel element is then arranged, for example, on the metal hub and supports the sprocket. The wheel element and the sprocket may comprise different materials. In this disclosure, the material comprising the worm wheel when it is formed as a single piece or the materials comprising the worm wheel when it is formed in multiple pieces are designated as the worm wheel material.

According to the invention, the compensating element has a middle section as well as a rear end section and a front end section. The rear end section in this case is connected to the gearbox housing, the front end section supports either the end of the worm shaft away from the engine or it supports a holder accommodating the end of the worm shaft away from the engine.

The holder may be, for example, a floating bearing arranged around the end of the worm shaft away from the engine, preferably formed as a roller bearing, in which the worm shaft is rotatably supported.

The compensating element is advantageously formed as a single piece, in which the center section is formed between the front and the rear end section.

The compensating element is preferably made of a material the expansion change of which is similar to the expansion change of the radius of the worm wheel. The expansion change of the material from which the compensating element is made preferably deviates no more than 20 to 40% from the expansion change of the worm wheel. With suitable dimensions, the compensating element itself then exhibits similar thermal expansion movements to those of the worm wheel. For instance, the wheel body may be made of glass-fiber-reinforced polyamide, for example PA66, and the sprocket may be made of pure polyamide, for example PA66.

The compensating element may be made, for example, of glass-fiber-reinforced material, for example polyamide having a glass-fiber share of 50 to 60%.

Advantageously, the material of which the sprocket is composed has the same or at least similar source properties as the material from which the compensating element is composed, or the materials from which the sprocket and the wheel element of the worm wheel are composed on average have the same or at least similar source properties as the material or the materials of which the compensating element is composed. This has the advantage that a potential material swelling due to air humidity fluctuations has the effect that the expansion of the worm wheel can approximately follow the expansion of the compensating element.

The worm wheel may be formed from glass-fiber-reinforced plastic material or may have a sprocket made of glass-fiber-reinforced plastic material, or may have a wheel element comprising glass-fiber-reinforced plastic material.

The worm wheel may also have a large steel hub, for example a steel hub the diameter of which is equal to or greater than half the diameter, for example greater than three-quarters the diameter of the worm wheel, in which the sprocket may be formed without glass-fiber reinforcement.

In order to then ensure that the absolute length alteration of the compensating element is the same at a certain temperature difference or is at least in the range of the linear deformation of the radius of the worm wheel plus the linear deformation of the radius of the worm shaft minus the linear deformation of the housing, the metal hub can now, for example, have a relatively small diameter as compared to the total diameter of the worm wheel. The major portion of the worm wheel diameter can thus be formed, for example, from one plastic material or from several plastic materials. The weight of the worm wheel can thereby be reduced as compared with a worm wheel made completely of metal.

Figure 9:
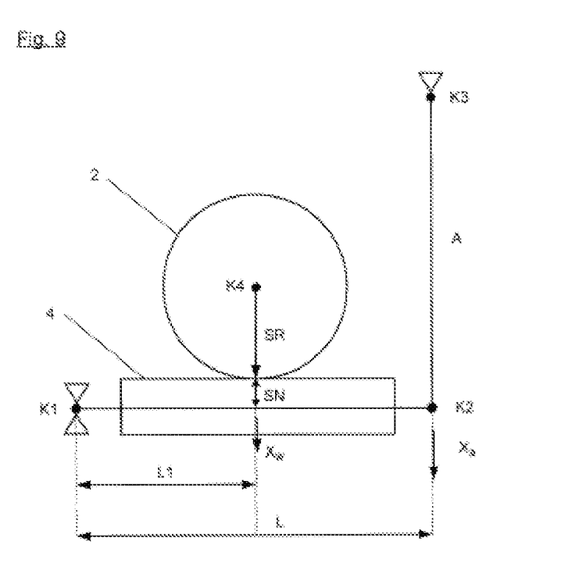
FIG. 9 shows a schematic representation of a worm gearbox.

The length that the compensating element must have between its fastening and support points in order for its linear expansion to approximately correspond to the change in the radius of the worm wheel can be calculated, as demonstrated by the following computational example, explained in reference to FIG. 9.

The following generally applies:

$$\Delta L = L_0 * \alpha * \Delta T \quad (1)$$

where $\Delta L$ is the value of the linear expansion of the compensating element. $L_0$ is the length of the compensating element at a reference temperature $T_0$, $\alpha$ is the coefficient of linear expansion, and $\Delta T$ is the temperature change.

FIG. 9 shows a schematic drawing of a worm gearbox with a worm wheel 2 into which a worm shaft 4 meshes. K1, K2, K3, and K4 define bearing points. The worm shaft 4 is supported at the two bearing points, K1 and K2. Bearing point K1 is formed as a fixed bearing, while bearing point K2 is formed as a floating bearing. Bearing points K1 and K3 are fixed bearings, which are attached to the housing that accommodates the worm gearbox. The worm wheel 2 is supported at bearing point K4, which defines the middle point of the worm wheel. The compensating element A is supported at fixed bearing point K3 and floating bearing K2. L defines the distance between the two bearing points, K1 and K2; L1 defines the distance between bearing point K1 and the contact point of the worm wheel 2 at the worm shaft 4 onto the K1-K2 axis of the worm shaft. SR is the radius of the worm wheel, $\alpha_{SR}$ is the effective coefficient of linear expansion of the worm wheel, SN is the radius of the worm, $\alpha_{SN}$ is the effective coefficient of linear expansion of the worm, A is the length of the compensating element, $\alpha_A$ is the effective coefficient of linear expansion of the compensating element, and $\alpha_G$ is the effective coefficient of linear expansion of the housing. The following results for the axial distance G:

$$G = SR + SN \quad (2)$$

The linear expansion of the housing $\Delta G$ between the center of the worm wheel and the central axis of the worm shaft may deviate from the linear deformation that results from the total of the changes from the worm wheel radius $\Delta SR$ and the change in the worm radius $\Delta SN$. The following applies to the deflection $X_w$:

$$X_w = \Delta SR + \Delta SN - \Delta G \quad (3)$$

The length ratio $L_1/L$ results in the deflection $X_a$ at floating bearing K2 with respect to $$X_a = X_w * L/L_1 \quad (4)$$

The compensating element A should experience the same relative deflection at bearing point K2 as the worm does from the deflection at $X_w$ and transfer the lever ratio $L/L_1$ to floating bearing K2. This is achieved in that the length and the coefficient of linear thermal expansion (CLTE) of the compensating element are selected such that the compensating element at point K2 expands precisely by distance $X_a$ as compared to the housing at this location due to the thermal expansion. The expansion of the compensating element minus the expansion of the housing between K2 and K3 should correspond to precisely $X_a$ such that:

$$X_a = A_0 * (\alpha_A - \alpha_G) * \Delta T \quad (5),$$

where $A_0$ is the length of the compensating element to be selected.

Insertion of (4) in (5) yields the following:

$$X_w * L/L_1 = A_0 * (\alpha_A - \alpha_G) * \Delta T.$$

Insertion of (3) into this equation results in the following:

$$(\Delta SR + \Delta SN - \Delta G) * L/L_1 = A_0 * (\alpha_A - \alpha_G) * \Delta T.$$

Insertion of (1) results in the following:

$$(SR_0 * \alpha_{SR} * \Delta T + SN_0 * \alpha_{SN} * \Delta T - G_0 * \alpha_G * \Delta T) * L/L_1 = A_0 * (\alpha_A - \alpha_G) * \Delta T,$$

which results in the following after the insertion of equation (2) and solving for $A_0$:

$$A_0 = L/L_1 * (SR_0 (\alpha_{SR} - \alpha_G) + SN_0 (\alpha_{SN} - \alpha_G))/(\alpha_A - \alpha_G).$$

With the present $\alpha_A$, $A_0$ must be selected as the length of the compensating element.

This computing example shows that the length of the compensating element can be clearly determined with the specified geometries of the worm wheel and of the worm shaft. If therefore the axial distance between the worm shaft and the worm wheel is not determined via an aluminum housing but rather via the compensating element, which advantageously comprises plastic, with suitable dimensioning and material selection, said plastic element may experience linear deformations that are very similar to the interaction between the worm and the worm wheel. The compensating element expands therefore just as much as the worm wheel and the worm shaft due to the ambient temperature. Thus, the backlash and/or the contact pressure between the worm shaft and the worm wheel remains constant.

With the additional effect of humidity, swelling of the diameter of the worm wheel can be automatically compensated for as well due to a simultaneous swelling in the compensating element if the material of the compensating element is selected accordingly. Thus, in a particularly preferred embodiment, the compensating element has the same material, i.e. for example the same polymer, as the worm wheel. Provided the worm wheel is formed as a single piece, it is advantageously made of said material. Provided the worm wheel has a sprocket, which is arranged on a hub, the sprocket is advantageously made of said material. If the worm wheel has a sprocket, wheel element, and hub, in which the wheel element is arranged between the hub and the sprocket, the wheel element is preferably made of said material. Of course, other parts of the worm wheel, provided it is formed as multiple parts, may comprise the same material as the compensating element.

This material is preferably a polyamide, especially preferably a glass-fiber-reinforced polyamide. Glass-fiber-reinforced polyamide is particularly strong and exhibits relatively low wear with high stress resistance.

The length of the compensating element depends on the coefficients of expansion of the worm shaft, worm wheel, and compensating element. Thus, worm wheels with a radially larger plastic portion may be used, which will reduce the costs and the weight and may increase the loading capacity of the worm wheel at the same time.

In a preferred embodiment, the inner diameter of the worm wheel is less than half its outer diameter.

While a toothing clearance or extension travel must be maintained with conventional designs to ensure that the gearbox does not become jammed at higher temperatures and with swelling due to air humidity, with the inventive device, the toothing clearance or the extension travel is consistently low in all temperature and humidity situations, whereby the engagement depth of the toothing remains consistently large and thus the tooth load is less. Thereby a particularly precise adjustment of the distance can be implemented between the worm wheel and the worm shaft.

The compensating element may be formed as integral with the gearbox housing or with a part of the gearbox housing. This has the advantage that it is attached to the housing in a captive manner, whereby the number of individual parts of the gearbox arrangement is hereby reduced.

In one inventive embodiment, the holder is a tubular worm guide, in which the worm shaft is arranged to be guided axially, in which the end of the worm shaft away from the engine may be supported so as to rotate in the tubular worm guide, preferably in a floating bearing, for example a roller bearing, which is arranged in the worm guide in a torsionally resistant manner.

In this embodiment, the compensating element is advantageously connected to the tubular worm guide, which forms the holder. On one hand, this has the advantage that the front end section of the compensating element formed as a mounting does not experience any additional increased load causing potential wear due to the rotation of the worm toothing; on the other hand, a more stable transfer of the movement from the worm toothing onto the worm shaft is achieved, particularly when the end of the worm toothing away from the engine is accommodated in a roller bearing, or a floating bearing, and said floating bearing is attached in the tubular worm guide.

One inventive embodiment makes provision for the gearbox housing to be formed in two pieces, in which, in one part, the worm wheel is supported so as to rotate and, the other part is the holder in which the worm shaft is supported so as to rotate. The compensating element in this case can be attached on the outside on the gearbox housing and can connect one part of the gearbox housing to the other part of the gearbox housing, for example by means of fastening elements that are arranged at the one and at the other part. In doing so, the wheel and the worm shaft are arranged in the two housing parts such that when the two housing parts are connected to one another, for example by a means of the compensating element or elements, the worm toothing of the worm shaft engages between the teeth of the worm wheel such that an effective connection is established between the worm wheel and the worm shaft.

With this embodiment, the one part is advantageously already connected to the other part via a hinge so as to pivot such that, in order to establish the effective connection between the worm wheel and the worm shaft, the worm shaft can be pivoted against the worm wheel.

The part of the gearbox housing in which the worm wheel is supported so as to rotate is preferably made of plastic. In doing so, it may be made of the same material as the worm wheel or as part of the worm wheel, for example a matrix material that preferably has fiber reinforcement. Compared with a metal, plastic is very light, which means that a further reduction in the overall weight of the device can be achieved with such type of housing. Because the compensating element does the compensating, such type of housing may naturally also be made of a different plastic.

The other part of the gearbox housing may also be made of plastic provided even more weight reduction is desired. However, it is preferably made of metal and especially preferably aluminum. In this manner, the engine and the worm shaft are easier to cool down, because metal generally dissipates heat better than plastic.

If the housing is formed of two parts or two pieces, one part of the gearbox housing can be connected to the rear end section of the compensating element, while the other part of the gearbox housing can be connected to the front end section of the compensating element, for example riveted or in detachable fashion, such that the worm toothing engages between the teeth of the worm wheel when the two parts of the housing are closed. If the two parts of the gearbox housing are connected to one another so as to pivot by means of a plastic compensating element, the motor axis is always flush with the worm axis. This means that a simpler coupling is possible between the worm wheel and the worm shaft; the worm shaft can even be formed as integral with the engine shaft.

In a simple variation on the inventive device, the compensating element is connected to the gearbox housing by means of a first connecting means, for example a sleeve, and via a second connecting means, for example a pin, in which the two connecting means engage with one another such that the compensating element, which may be capable of pivoting, is fastened to the gearbox housing, in which either the gearbox housing has the second connecting means and the rear end section has the first connecting means, or the rear end section has the second connecting means and the gearbox housing has the first connecting means. In this case, the compensating element can be fastened to the gearbox housing especially simply and either directly accommodate the end of the worm shaft away from the engine at its front end section or, if the end of the worm shaft away from the engine is guided in a floating bearing, for example a roller bearing, directly accommodate said roller bearing, which then forms the holder.

The connecting means that connect the compensating element to the gearbox housing are advantageously arranged at a fixed distance and in a fixed direction with respect to the steering axis as soon as the compensating element is connected to the gearbox housing.

Advantageously, the gearbox housing preferably has a fixed bearing formed preferably as a roller bearing, in which the end of the worm shaft away from the engine is accommodated, in which the fixed bearing may be formed so as to pivot. This has the advantage that the bearing does not start running sluggishly due to tilting.

As is the case, for example, with electromechanical power steering systems, the device can have a drive motor, which drives the worm shaft at its end on the engine side. The worm shaft may be guided at its end on the engine side in a fixed bearing formed, for example, as a roller bearing.

Furthermore, the gearbox housing may have at least yet one further fixed bearing preferably formed as a roller bearing in which the steering shaft is accommodated so as to rotate. Advantageously, the gearbox housing, however, has two such further fixed bearings between which the worm wheel is then arranged.

To ensure that the worm shaft is stably guided so as to rotate in the gearbox housing, a floating bearing preferably formed as a roller bearing, in which the worm shaft is guided so as to rotate, is arranged at its end away from the engine.

At its end on the engine side, the worm shaft preferably has the drive motor, which drives the worm shaft at its end on the engine side.

With conventional designs, a suspension spring of the worm shaft is sometimes implemented against the worm wheel in order to reduce the toothing backlash, at least at low torques. At medium to large torques, the toothing forces overcome the suspension spring forces and press the worm shaft out of the engagement and against a potential end stop at which the engagement depth perceptively drops and the tooth loading of the worm wheel thus increases.

In order to prevent such type of effects, a spring effect can be incorporated into the design of the compensating element, which, however, must only provide very small spring deflections, because the main part of the compensating movement is compensated for by the thermal expansion and swelling of the compensating element. In this manner, a simple conventional fixed bearing can also be used for the worm if it does not have to swivel, but rather can be guided in the compensating element accordingly and can be guided in the worm axis in an aligned manner. In order to provide a spring effect in the compensating element, said compensating element can be connected, for example, to the housing additionally via a spring. The compensating element could also be formed in multiple pieces, in which an elastic element or a spring element could be provided, for example, between two adjacent pieces or at one of the two end sections.

The designations used in the following description such as top, bottom, left, right, and the like relate to the exemplary embodiments and should not be considered limiting in any manner including when they relate to preferred embodiments.

The invention is explained in more detail in the following using drawings. The following is shown.

Figure 1:
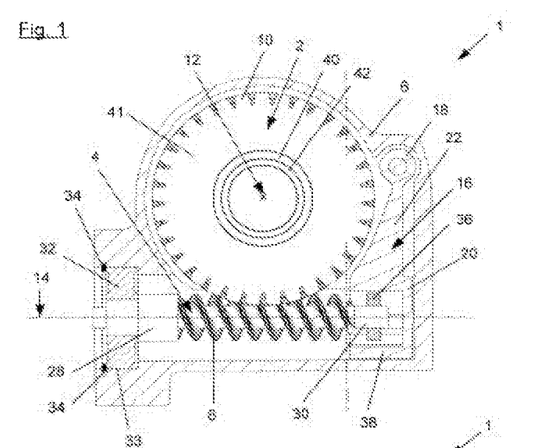
FIG. 1 shows a first exemplary embodiment of an inventive gearbox arrangement.
Figure 2:
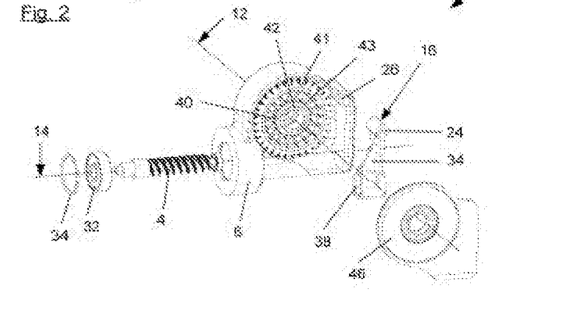
FIG. 2 shows an exploded view of the first exemplary embodiment.

FIG. 1 shows an inventive device 1 in the form of a worm gearbox, for example of an electromechanical power steering system, with a worm wheel 2, a worm shaft 4, and a gearbox housing 6. The worm shaft 4 has worm toothing 8, which engages between teeth 10 of the worm wheel 2, and the worm wheel 2 rotates around a steering axis 12 when the worm shaft 4 rotates around its rotational axis 14. The inside of the gearbox housing 6 contains a compensating element 16, which has a rear end section 18, a front end section 20, as well as a middle section 22 arranged between the rear end section 18 and the front end section 20. The rear end section 18 of the compensating element 16 is formed as a sleeve 24 and is attached at a pin 26 of the gearbox housing 6 so as to pivot, as shown in FIG. 2. The worm shaft 4 has an end 28 on the engine side and an end 30 away from the engine. The range of the worm toothing 8 of the worm shaft 4 extends between the end 28 on the engine side and the end 30 away from the engine. There is a fixed bearing 32, formed on the engine-side end 28, which in the present case is a roller bearing. The fixed bearing 32 may be formed so as to pivot. It is anchored in the fixed bearing mounting 33 of the gearbox housing 6 in a fixed manner with anchoring elements 34. The end 30 away from the engine of the worm shaft 4 has a floating bearing 36, formed preferably as a roller bearing, in which the worm shaft 4 is accommodated in a rotating manner. The front end section 20 of the compensating element 16 is formed as a mounting 38 for the floating bearing 36. The floating bearing 36 is centered. In said mounting 38 of the compensating element 16 and accommodated in a torsionally resistant manner. The worm shaft 4 is centered by said mounting 38 and is pressed against the worm wheel 2 with a predefined contact pressure.

The worm wheel 2 in this exemplary embodiment has sprocket 41 arranged around a central part 40, with the sprocket sitting on the center part 40 in a torsionally resistant manner. The center part 40 is formed as a plastic ring, which sits on a metal hub 42, in a torsionally resistant manner, which is solidly connected to a steering shaft (not shown) and engages the steering shaft, in which the steering shaft can rotate around the steering axis 12, which extends in the center axially through the steering shaft. Of course, the sprocket 41 may also be arranged directly on the metal hub and be arranged thereupon in a torsionally resistant manner.

FIG. 2 shows the individual components of an exemplary device 1 in a perspective view. The anchoring element 34 in this exemplary embodiment is formed as a circlip; the fixed bearing 32, which supports the worm shaft 4 so as to rotate, is clamped into the fixed bearing mounting 33 of the gearbox housing 6 in a torsionally resistant manner. The worm wheel 2 is rotatably arranged around the steering axis 12 in the gearbox housing 6. The middle part 40 does not have to be implemented as a plastic ring as shown in FIG. 1, but rather may also be formed, for example, as a wheel element 43 arranged between the sprocket 41 and the metal hub 42 on which the sprocket 41 is attached in a torsionally resistant manner.

The wheel element 43 and the sprocket 41 at hand are made of different materials. For example, the wheel element 43 may be made of glass-fiber-reinforced plastic, while the sprocket 41 is made of plastic without glass-fiber reinforcement.

The worm wheel 2 may also be a single piece, for example, and may be made of a single material, preferably glass-fiber-reinforced plastic. It may also be formed of two pieces, in which, in this case, it comprises a hub made of metal for example and a sprocket made of non-glass-fiber-reinforced plastic, for example.

Compensating element 16 has the sleeve 24 at its rear end section 18, with the sleeve in the present exemplary embodiment being connected to the mounting 38 via a bar 44. The bar 44 stabilizes the compensating element 16, so that no torsions take place between the sleeve 24 and the mounting 38.

The sleeve 24 of the compensating element 16 is connected to the pin 26 of the gearbox housing 6 so as to pivot in the exemplary embodiment shown. A housing cover 46, which is arranged on the gearbox housing 6, protects the device 1 from dust and dirt.

Figure 3:
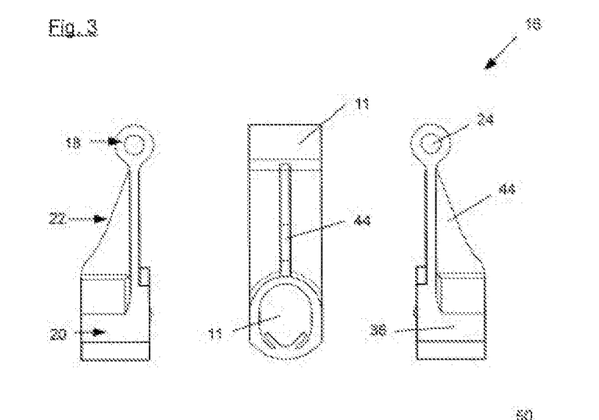
FIG. 3 shows multiple views of an inventive compensating element.

FIG. 3 shows three lateral views of the compensating element 16. The compensating element 16 has the rear end section 18, the center section 22 connected to the rear end section 18, and the front end section. 20 connected to the center section 22. The rear end section 18 is connected to the sleeve 24 as a single piece or formed as a sleeve 24. The sleeve 24 connects the compensating element 16 to the gearbox housing 6.

The floating bearing mounting 38 of the front end section 20 of the compensating element 16 accommodates the floating bearing 36 of the worm shaft 4 in a torsionally resistant manner. The middle section 22 of the compensating element 16 has the bar 44, which stabilizes the floating bearing mounting 38 and the sleeve 24 against one another.

The compensating element 16 is suitably dimensioned and selected such that when, due to thermal fluctuations and/or humidity fluctuations, the worm wheel 2 expands, the compensating element follows this expansion to the same extent, so that the worm toothing 8 also further engages the worm shaft 4 with practically the same amount of pressure between the teeth 10 of the worm wheel 2, because the worm shaft 4 can follow the expansion of the worm wheel 2 through diversion at the end 30 away from the engine.

Figure 4:
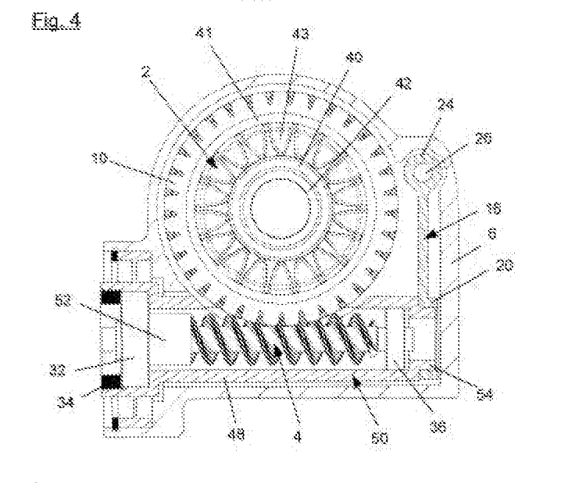
FIG. 4 shows a second example of the inventive gearbox arrangement.

FIG. 4 shows a second exemplary embodiment of the worm gearbox 1. The worm wheel 2, which, in this exemplary embodiment may be implemented in multiple pieces, for example in two pieces, and has a sprocket 41, which is arranged on a wheel element 43 in a torsionally resistant manner, is attached on the end around the metal hub 42 arranged on the steering shaft in a torsionally resistant manner. Alternatively, the worm wheel 2 may of course also be designed in three parts, in which the sprocket 41 is then accommodated, for example, clamped between two wheel elements 43. The worm shaft 4 in the exemplary embodiment according to FIG. 4 is guided in a guide pipe 48 of a worm guide 50 in a supported manner. The floating bearing 36 is likewise arranged in the guide pipe 48 in a torsionally resistant manner and accommodates the end 30 of the worm shaft 4 away from the engine.

Figure 5:
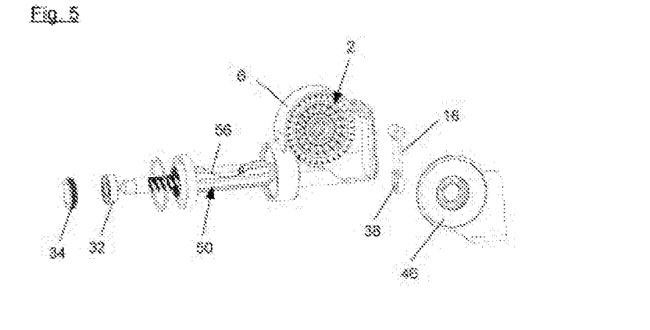
FIG. 5 shows an exploded view of the second exemplary embodiment.

The worm guide in has an engine-side foot piece 52 on the end 28 on the engine side, with the foot piece accommodating the fixed bearing 32, as can be seen in FIG. 5. The fixed bearing 32 is clamped to the front end of the engine-side foot piece 52 via an anchoring element 34 formed as a threaded ring and thus accommodated in the worm guide 50 in a torsionally resistant manner.

The side of the worm guide 50 opposite the engine-side foot piece 52 has an end piece 54, which is recessed on the guide pipe 48 with a somewhat smaller diameter than the guide pipe 48. Said end piece 54 is accommodated in the front end section 20 of the compensating element 16 and thus stabilizes the position of the worm guide 50 relative to the worm wheel 2 in the housing 6.

The worm guide 50 has a jacket surface recess 56 so that the teeth 10 of the worm wheel 2 can engage the worm toothing 8 of the worm shaft 4. The housing cover 46 shown in FIG. 5 is, in turn, used to protect the device 1 against dust and dirt.

Figure 6:
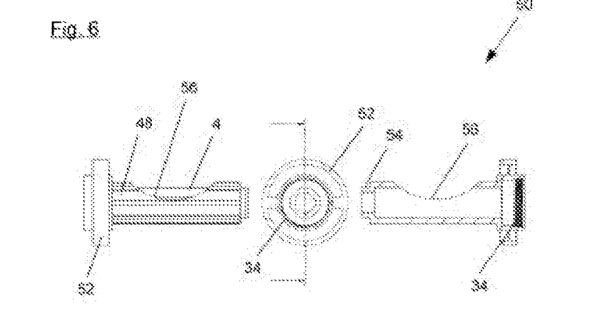
FIG. 6 shows a worm guide.

FIG. 6 shows the worm guide piece 50 in a lateral top view (left), in a top view onto the engine-side foot piece 52 (center), and in a lateral sectional view (right). The guide pipe 48 of the worm guide 50 is cylindrical and has a jacket surface recess 56 so that the worm wheel 2 can engage the worm shaft 4. The engine-side foot piece 52 is connected to the guide pipe 48 or formed as integral with it. The threaded ring 34 in the engine-side foot piece 52 presses the fixed bearing 32 against the stop of the foot piece 52 and thus fastens the fixed bearing 32 into the foot piece 52 of the worm guide 50 in a torsionally resistant manner.

Figure 7:
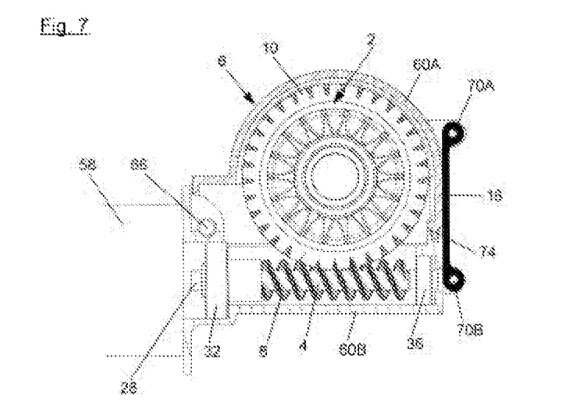
FIG. 7 shows a third example of the inventive gearbox arrangement.
Figure 8:
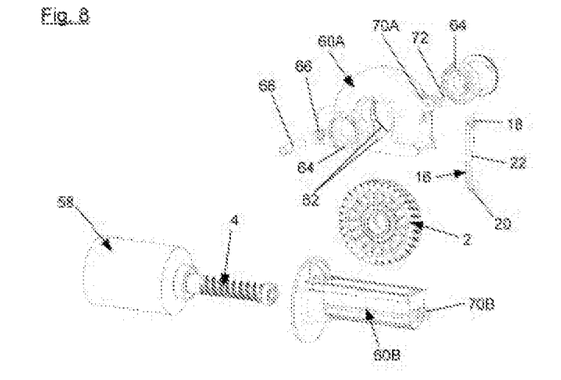
FIG. 8 shows a view of the individual parts of the inventive gearbox arrangement of the third exemplary embodiment.

Lastly, FIGS. 7 and 8 show a third exemplary embodiment of the inventive device. In this exemplary embodiment, a drive motor 58 is schematically shown that engages with the engine-side end 28 of the worm shaft 4 and drives the worm shaft 4.

The gearbox housing 6 in this embodiment is constructed in two parts. One part of the gearbox housing 60a has two fixed bearing mountings 62, into which one further fixed bearing 64, preferably formed as a roller bearing, is accommodated in a torsionally resistant manner and is connected to the housing in a torsionally resistant manner. The steering shaft is rotatably arranged around the steering axis 12 in these two further fixed bearings 64.

In one part of the housing 60a, the worm wheel 2 is connected to the steering shaft in a torsionally resistant manner around the steering axis 12, between the two further fixed bearings 64.

The worm shaft 4 is accommodated in the other part of the housing 60b and guided at its end 28 on the engine side as well as at its end 30 away from the engine in a roller bearing 32, 36 on each end. The two halves of the gearbox housing 60a, 60b are connected to one another via a hinge 66 and a common hinge cotter pin 68. One part of the housing 60a has a fastening means 70a to which, for example, the compensating element 16 may be attached with the assistance of a cotter pin 72. The other part of the housing 60b has a further fastening means 70b, which may also be connected to the compensating element 16 by means of a cotter pin when the two housing parts 60a, 60b are pivoted against one another and closed.

To ensure that the compensating element 16 can follow expansion movements of the worm wheel 2 and the worm shaft 4 with changing temperatures and changing humidity, a gap 74 must remain between the two housing parts 60a, 60b.

For example, if the worm wheel 2 and the worm shaft 4 expand as the temperature increases and/or if the worm wheel 2 swells due to higher humidity and in doing so expands, the gap 74 enlarges because the compensating element 16 follows said expansion movements, because it is made at least partially of the same or a similar material, for example plastic, which is preferably glass-fiber-reinforced, as the worm wheel 2.

If the ambient temperature drops, on the other hand, the gap 74 becomes smaller, because the compensating element 16 arranged between one part of the housing 60a and the other part of the housing 60b and connecting the two housing parts with one another presses the two housing parts against one another. In this manner, the so-called compensating element 16 can be provided on the outside of the housing and simultaneously form a locking mechanism for the two housing parts 60*a*, 60*b*. In both cases however, there is assurance, provided that the worm wheel 2 and compensating element 16 have similar coefficients of expansion and swelling, that the size of the gap 74 adjusts itself such that sufficient diverting or yielding of the worm shaft 4 against the worm wheel 2 is ensured, that, i.e., no tilting occurs between the worm wheel 2 and worm shaft 4 on one hand, and there is always sufficient engagement of the worm shaft 4 into the worm wheel 2 as a function of temperature and humidity on the other hand.

The invention was explained by means of three preferred exemplary embodiments without limiting it to said exemplary embodiments. The features of individual exemplary embodiments may be freely combined or exchanged among one another, provided there is compatibility. Thus, for example, a drive motor 58 is not necessarily provided only in the third exemplary embodiment, but rather may also be provided in the first and in the second exemplary embodiment as a driving element. In an embodiment in which the gearbox housing comprises two housing parts, it is also not necessary for one side to be connected to the other side via a hinge 66. It is also conceivable to have further fastening means that are arranged on each housing part, which are connected to one another, for example, via a further compensating element 16, instead of the hinge, which connects the two housing parts 60*a*, 60*b* with one another. Devices of the type described herein are often used as a part of electromechanical power steering systems.

REFERENCE LIST

1 Device, electromechanical power steering
2 Worm wheel
4 Worm shaft
6 Gearbox housing
8 Worm toothing
10 Teeth
12 Steering axis
14 Rotational axis
16 Compensating element
18 Rear end section
20 Front end section
22 Middle section
24 Sleeve, first connecting means
26 Pin, second connecting means
28 End on engine side
30 End away from engine
32 Fixed bearing
33 Fixed bearing mounting
34 Anchoring elements, circlip, threaded ring
36 Floating bearing
38 Mounting, floating bearing mounting
40 Middle part, ring shape of the wheel element
41 Sprocket
42 Metal hub
43 Wheel element
44 Bar
46 Housing cover
48 Guide pipe
50 Worm guide
52 Engine-side foot piece
54 End piece
56 Jacket surface recess
58 Drive motor
60*a* One part of the gearbox housing
60*b* Other part of the gearbox housing
62 Fixed bearing mounting
64 Additional fixed bearing
66 Hinge
68 Hinge cotter pin
70*a*, 70*b* Fastening means
72 Cotter pin
74 Gap

The invention claimed is:

1. A device (1), comprising:
a worm wheel (2) having teeth (10), which is rotatably arranged around a steering axis (12) and can be connected to a steering shaft that can rotate around the steering axis (12) in a torsionally resistant manner;
a worm shaft (4) supported so as to rotate around a rotational axis (14), with the worm shaft having an end (28) on an engine side and an end (30) away from an engine, as well as worm toothing (8), which engages between the teeth (10) of the worm wheel (2) such that when the worm shaft (4) rotates around the rotational axis (14), the worm wheel (2) rotates around the steering axis (12);
a gearbox housing (6, 60A, 60B), in which the worm wheel (2) and the worm shaft (4) are supported so as to rotate; and
a compensating element (16),
wherein the compensating element (16) has a middle section (22), as well as a rear end section (18) and a front end section (20), wherein the rear end section (18) is connected to the gearbox housing (6, 6A), and the front end section (20) retains the end (30) away from the engine of the worm shaft (4) or a holder accommodating the end (30) away from the engine of the worm shaft (4), and the compensating element (16) is made of a material an expansion change of which is similar to an expansion change of the radius of the worm wheel (2) so that a contact pressure between the worm shaft (4) and the worm wheel (2) remains constant.

2. The device (1) according to claim 1, wherein the holder is a tubular worm guide (50), in which the worm shaft (4) is guided axially and accommodated so as to rotate axially, wherein the end (30) away from the engine of the worm shaft (4) is supported so as to rotate in the worm guide (50) formed in a shape of a tube.

3. The device according to claim 1, wherein the holder is a floating bearing (36) arranged around the end (30) away from the engine of the worm shaft (4), with the holder retaining the worm shaft (4) in a rotatable manner.

4. The device (1) according to claim 1, wherein the housing (60A, 60B) is formed as two parts, wherein a first part (60A) rotatably supports the worm wheel (2) and a second part (60B) rotatably supports the worm shaft (4) and is the holder.

5. The device (1) according to claim 4, wherein one the first part (60A) is connected to the second part (60B) so as to pivot via a hinge (66), wherein the first part (60A) is made of plastic.

6. The device (1) according to claim 4, wherein the second part (60B) is made of aluminum.

7. The device (1) according to claim 4, wherein one the first part (60A) of the gearbox housing (6) is connected to the rear end section (18) of the compensating element (16) and the second part (60B) of the gearbox housing (6) is connected to the front end section (20) of the compensating element (16) such that the worm toothing (8) engages between the teeth (10) of the worm wheel (2).

8. The device (1) according to claim 1, wherein the compensating element (16) is formed as integral with the gearbox housing (6, 60A) or a part thereof.

9. The device (1) according to claim 1, wherein the inner diameter of the worm wheel (2) is less than half its of the outer diameter of the worm wheel (2).

10. The device (1) according to claim 1, wherein the worm wheel (2) is made of glass-fiber-reinforced plastic material, or has a sprocket (41) made of glass-fiber-reinforced plastic material, or has a wheel element (43) made of glass-fiber-reinforced plastic material.

11. The device (1) according to claim 1, wherein the worm wheel has a steel hub having a diameter, wherein the diameter is greater than three-quarters of a diameter of the worm wheel, wherein a sprocket may be formed without glass-fiber reinforcement.

12. The device (1) according to claim 1, wherein the compensating element (16) is formed from a material selected from the group consisting of a polymer and a plastic.

13. The device (1) according to claim 1, wherein the compensating element (16) is connected to the gearbox housing (6, 60A, 60B) via a first connecting means (24) and a second connecting means (26), wherein the connecting means (24, 26) engage with one another such that the compensating element (16) is attached to the gearbox housing (6, 60A, 60B), so as to pivot, wherein either the gearbox housing (6, 60A) has the second connecting means (26) and the rear end section (18) has the first connecting means (24), or the rear end section (18) has the second connecting means (26) and the gearbox housing (6, 60A) has the first connecting means (24), wherein the first connecting means (24) is a sleeve (24) and the second connecting means (26) is a pin.

14. The device (1) according to claim 13, wherein the connecting means (24, 26) are arranged at a fixed distance and in a fixed direction with respect to the steering axis (12) when the compensating element (16) is connected to the gearbox housing (6, 60A, 60B).

15. The device (1) according to claim 1, wherein the gearbox housing (6, 60A) has a fixed bearing (32), formed as a roller bearing, in which the engine-side end (28) of the worm shaft (4) is accommodated, wherein the fixed bearing (32) is formed so as to pivot.

16. The device (1) according to claim 1, wherein the gearbox housing (6, 60A) has at least one fixed bearing (64), formed as a roller bearing, in which the steering shaft is accommodated so as to rotate.

17. The device (1) according to claim 1, having a drive motor (58), which drives the worm shaft (4) on the engine-side end (28) of the worm shaft (4).

18. An electromechanical power steering system, having a device (1) according to claim 1.

19. The device (1) according to claim 1, wherein the expansion change of the material from which the compensating element (16) is made deviates no more than 20% to 40% from the expansion change of the worm wheel (2).

20. The device (1) according to claim 12, wherein the compensating element (16) is formed from a material selected from the group consisting of polyamide and glass-fiber-reinforced polyamide.

* * * * *